United States Patent [19]

Radl

[11] Patent Number: 4,469,415
[45] Date of Patent: Sep. 4, 1984

[54] HIGHLY MAGNIFIED STEREO VIEWING

[75] Inventor: Bruce M. Radl, Billerica, Mass.

[73] Assignee: Eikonix Corporation, Bedford, Mass.

[21] Appl. No.: 451,017

[22] Filed: Dec. 20, 1982

[51] Int. Cl.³ .................... G02B 27/22; G02B 21/22
[52] U.S. Cl. ................................. 350/517; 350/131; 350/133
[58] Field of Search ............... 350/517, 516, 515, 508, 350/133, 138, 134, 135, 131, 130, 576

[56] References Cited

U.S. PATENT DOCUMENTS 1,114,232 10/1914 Cheron .................................. 350/133
2,891,444 6/1959 Ewald .................................... 350/517
3,261,977 7/1966 Van der Velden .................. 350/130

Primary Examiner—Jon W. Henry
Attorney, Agent, or Firm—Charles Hieken

[57] ABSTRACT

A stereo microscope has a stereo pair of photographs illuminated by a condenser lens illuminating system. A pair of primary magnifying objective lenses focus a magnified image of the stereo pair upon a pair of small diffuse screens. A pair of large aperture objective lenses focus the images on the small diffuse screens in superimposed relationship upon the plane of a large field lens that focuses respective ones of the superimposed further magnified images upon a pair of exit pupils through which an observer looks. The primary magnifying objective lens, the small diffuse screen and the exit pupils are aligned along respective left and right optical axes. The large aperture objective lenses are displaced slightly toward each other from these optical axes. The field lens is centered about an axis midway between the left and right axes.

6 Claims, 1 Drawing Figure

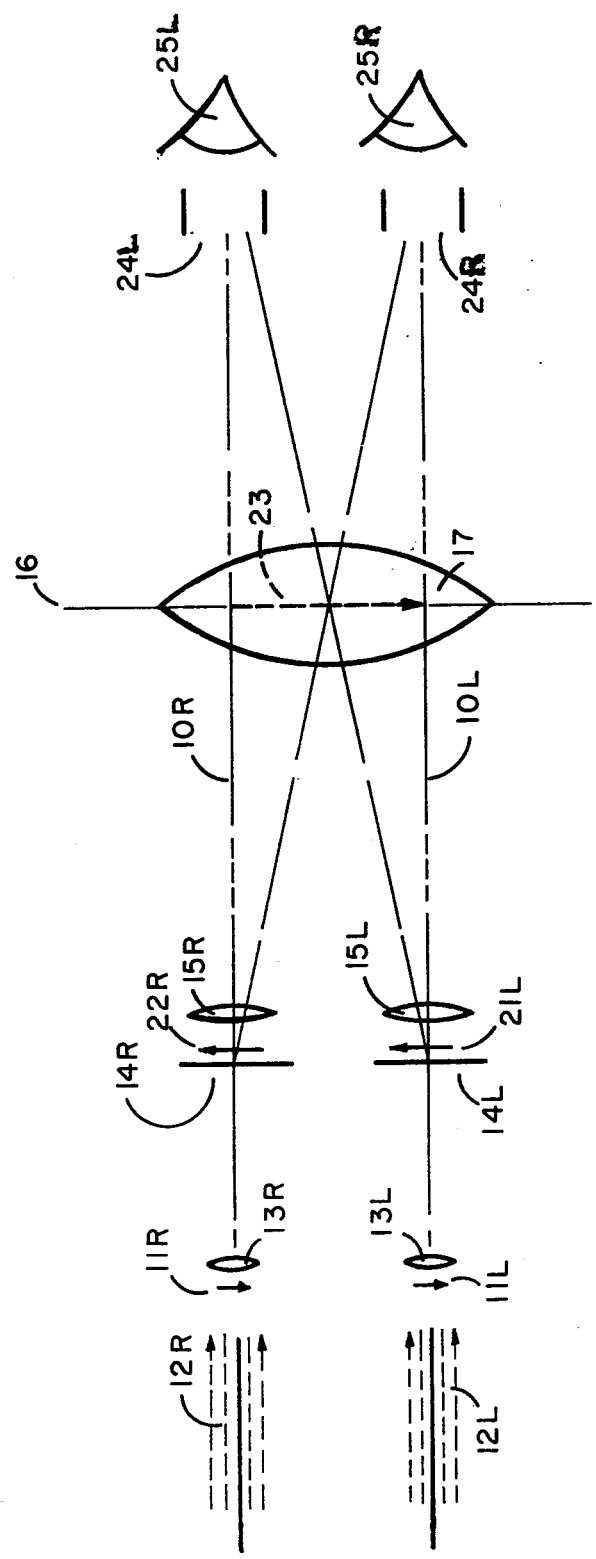

HIGHLY MAGNIFIED STEREO VIEWING

The present invention relates in general to stereo viewing and more particularly concerns a novel system for screen-like viewing of stereo pairs with high magnification with a system that is free from moving parts and provides the observer with a highly magnified sharp stereo image of a stereo pair.

A microscope can form a highly magnified image of a small section of a photograph. Typically, increased microscope magnification results in reduced exit pupil diameter. Binocular microscopes use eye pieces which adapt to various observers eyes by allowing an interpupillary distance adjustment to place the exit pupils at the location of the observer's eyes. A screen viewer diffuses the image light and allows vision of the image from nearly any position before the screen. A device which creates a large screen image, yet confines the image light to large exit pupils, may be used to display a stereo image which appears to exist at the screen surface to the observer. Such a device is manufactured by Vision Engineering Ltd. and comprises a lenticular screen that diverges the rays nominally headed for the small exit pupil and has an undesirable characteristic of a coarse cross-line structure which is easily seen. Spinning the screen about its center lowers the visibility of this cross-line structure. A practical requirement for this spinning screen is that the spinning assembly be well balanced and lightweight. A lens system projects the left and right images of a stereo pair upon the object side of the spinning screen. Light from each image of a stereo pair transmitted by the spinning screen is confined to respective ones of a pair of enlarged exit pupils of the order of 1¼" in diameter. When each exit pupil illuminates a respective eye of the observer, the observer perceives a stereo image on the spinning screen.

During the course of a preliminary novelty search in subclasses 9, 36 and 130 of class 350, U.S. Pat. Nos. 3,704,932, 3,909,106, 3,964,818, 4,168,106, 3,994,558, 4,217,025 were uncovered.

It is an important object of this invention to provide an improved system for viewing highly magnified stereo pairs without moving parts.

According to the invention, there is means, such as a stereo photograph, for providing first and second magnifiable scenes of a stereo pair. There are first and second primary magnifying objective lens means for magnifying said first and second magnifiable scenes, respectively, to provide first and second magnified images upon first and second small diffuse screens, respectively. There are first and second large aperture objective means for focusing the images on said first and second diffuse screens, respectively, in superimposed relationship upon large field lens means for focusing respective ones of said superimposed images upon first and second exit pupils, respectively, whereby an observer with eyes within the exit pupils sees left and right images with left and right eyes, respectively, having the brightness of the image on the small diffuse screen but magnified substantially to the size of the field lens.

Numerous other features, objects and advantages of the invention will become apparent from the following specification when read in connection with the accompanying drawing, the single FIGURE of which is a diagrammatic representation of a preferred embodiment of the invention.

With reference now to the drawing, there is shown a diagrammatic representation of a preferred embodiment of the invention. Two photographs 11L and 11R, comprising a stereo pair, receive illumination 12L and 12R, respectively, typically from a light source and condensing lens system. Primary magnifying objective lenses 13L and 13R focus the highly magnified images of photographs 11L and 11R upon small diffuse screens 14L and 14R, respectively. These screens are smaller than one typically used for direct viewing and are about an inch in diameter. The smaller screen produces a brighter image than produced upon a larger screen in inverse proportionality to the screen areas. The small diffuse screens 14L and 14R scatter light over a wide angle, primarily upon the large objective lenses 15L and 15R, respectively, to fill the pupils of these objective lenses so that they become the limiting pupils in the system. For a 50 mm focal length, the f/1.4 pupil of each of lenses 15L and 15R is 35 mm in diameter.

Objective lenses 15L and 15R magnify the images on small diffuse screens 14L and 14R, respectively, and focus them in the central plane 16 of large field lens 17. Objective lenses 15L and 15R are also displaced slightly toward each other from left and right optical axes 10L and 10R, respectively, to cause superimposition of the left and right images 21L and 22R, respectively, at 23 in the plane 16 of field lens 17.

Field lens 17 focuses an image of the pupils of left and right lenses 15L and 15R, respectively, at approximately unit magnification upon exit pupils 24L and 24R, respectively, so that left and right eyes 25L and 25R perceive highly magnified images of photographs 11L and 11R, respectively, to enable the observer to perceive a highly magnified stereo image of the scene represented by photographs 11L and 11R.

The specific structures for implementing the system shown in the drawing are well-known in the art, and those skilled in the art can readily practice the invention from the foregoing description. In a specific example, the following components were used:

Illumination sources 12, Gilway Lens End Lamp #L8006

Primary magnifying objectives 11, 25 mm f/4 Olympus objectives

Small diffuse screens 14, 3M LS 85 diffuse screens

Large aperture objective lenses 15, 50 mm f/1.4 Pentax camera objectives

Field lens 17, 1 Pair Rolyn optic lenses 6" diameter, 12" focal length.

There has been described novel apparatus and techniques for providing a highly magnified sharp stereo image of a stereo pair with structure that is relatively easy and inexpensive to fabricate without moving parts. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed:

1. Stereo viewing apparatus comprising, first and second diffuse screens, first and second primary magnifying objective lens means for focusing the images of first and second scenes comprising a stereo pair upon said first and second diffuse screens respectively, field lens means for receiving further magnified superimposed images of the images focused on said first and second diffuse screens, first and second large aperture objective lens means for focusing the images on said first and second diffuse screens respectively in superimposed relationship upon said field lens means, and first and second exit pupil means for receiving only respective ones of said first and second superimposed images, whereby an observer with first and second eyes adjacent to said first and second exit pupil means respectively may observe in stereo a highly magnified image of the scene represented by a stereo pair when located in the object plane of said first and second primary magnifying objective lens means respectively.

2. Stereo viewing apparatus in accordance with claim 1 wherein said primary magnifying objective lens means, said small diffuse screen means and said exit pupil means are aligned along respective parallel first and second optical axes respectively, said first and second large aperture objective lens means having their centers displaced slightly toward each other for focusing the images on said first and second diffuse screens respectively in superimposed relationship upon said field lens means, the axis of said field lens means being located between said first and second optical axes.

3. Stereo viewing apparatus in accordance with claim 1 and further comprising first and second sources of illumination for illuminating the object plane of said first and second primary magnifying objective lens means respectively.

4. Stereo viewing apparatus in accordance with claim 1 wherein said large aperture objective lens means comprise limiting pupils for said system.

5. Stereo viewing apparatus in accordance with claim 1 wherein the area of each of said diffuse screens is of the order of but slightly larger than that of said large aperture objective lens means.

6. Stereo viewing apparatus in accordance with claim 5 wherein the diameter of each of said diffuse screens is of the order of one inch.

* * * * *